United States Patent Office 2,986,348
Patented May 30, 1961

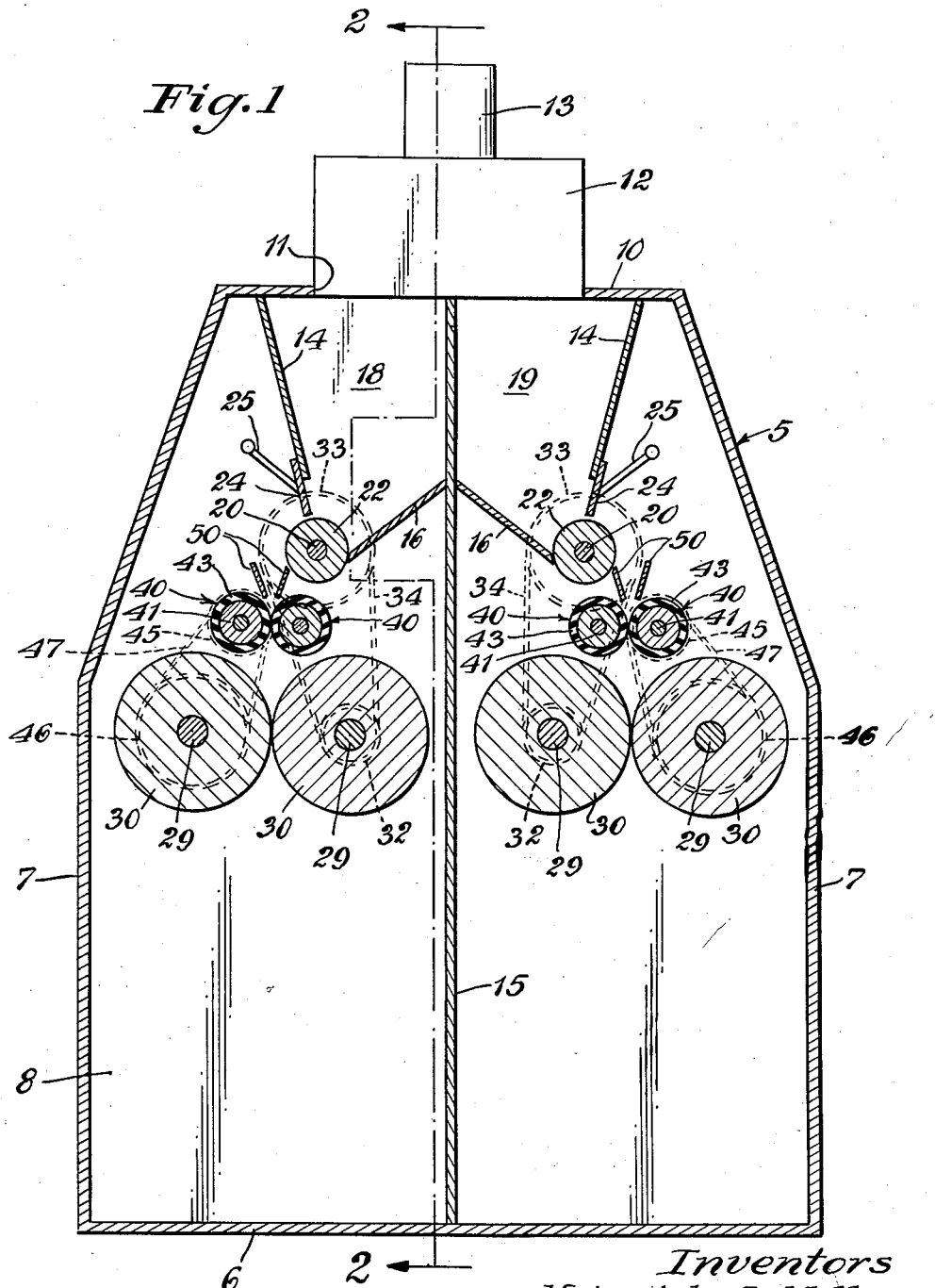

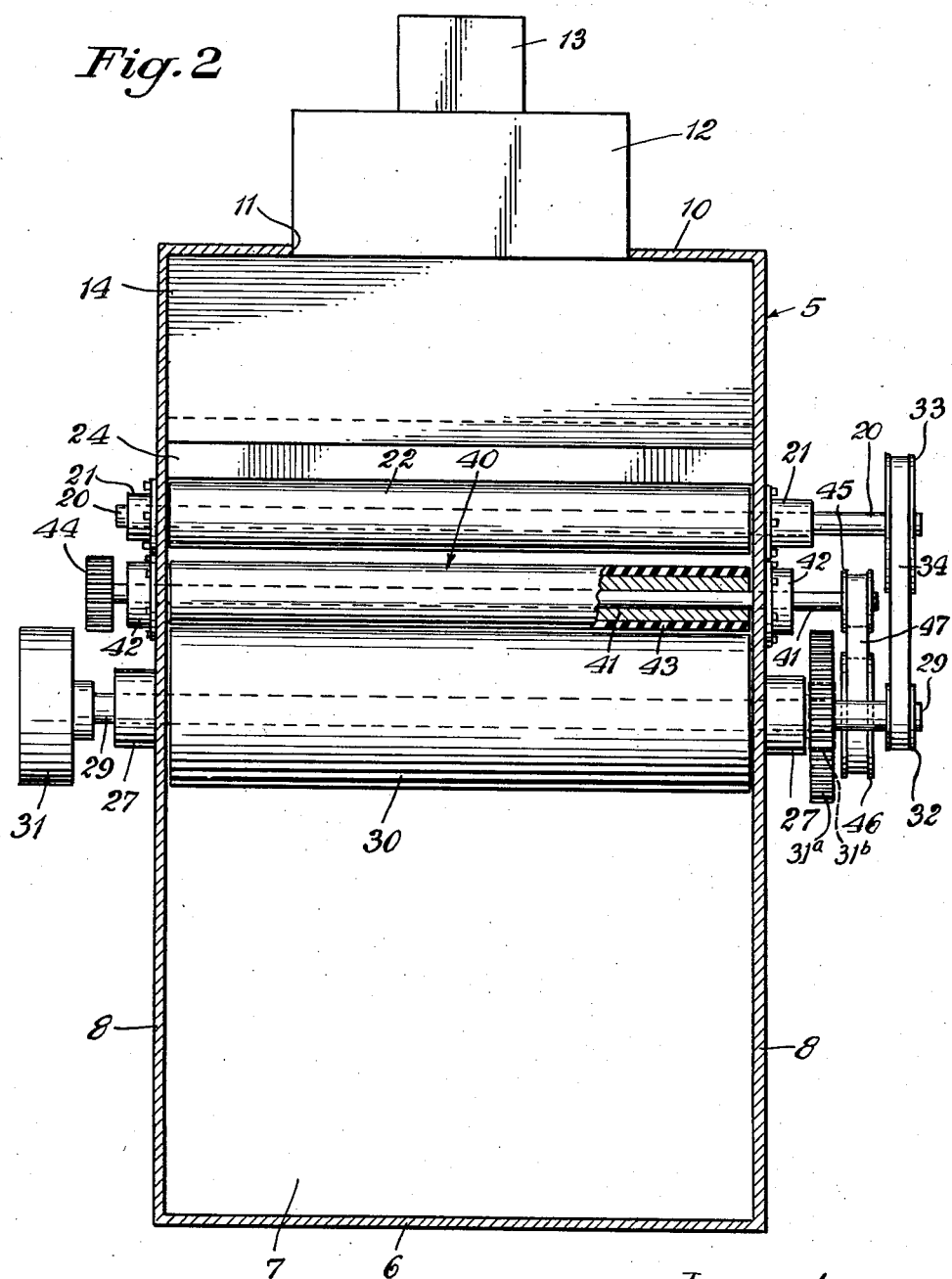

2,986,348

GRAIN MILLING MACHINES

Heinrich A. Noll, Winnipeg, Manitoba, Canada (300 N. Wilshire Lane, Arlington Heights, Ill.), and Abram Neufeld, 503 River Ave., Winnipeg, Manitoba, Canada Filed Mar. 22, 1957, Ser. No. 647,809

5 Claims. (Cl. 241—222)

The present invention relates to milling machines for milling flours from various grains, and more particularly relates to a feed device for feeding the grain to be milled to the milling rollers in such a manner that the milling capacity of the mill is increased to more than double its normal output, while at the same time improving the quality of the flour product.

One object of the invention is to provide a flour mill having a pair of milling rollers and to provide means for feeding the grain to be milled to the rollers so that the grain feed will be substantially equal in speed to the relative speed of the milling rollers.

Another object is to provide a milling machine for grain and the like having a pair of milling rollers and to provide a pair of feed rollers arranged thereabove and adapted to feed the grain to be milled to the milling rollers at a speed greater than the speed of gravity fall and to feed said grain directly to the bite of the milling rollers.

Another object is to provide a milling machine having two milling rollers of which one is driven at a lower speed than the other, and to feed the grain to be milled to these two milling rollers by means of a pair of coacting rubber rollers arranged thereabove which are adapted to be rotated at a speed approximately equal to the circumferential speed of the slower rotating milling roller.

Another object is to provide a milling machine having two coacting milling rollers one of which rotates at a lower speed than the other, and means arranged thereabove for feeding the grain to be milled to said rollers at a rate of speed substantially equal to the circumferential speed of the slower rotating milling roller, whereby during the first coarse grinding stage the grains are so rotated or adjusted by the feed rollers that they enter the milling rollers in their longitudinal direction or broadwise, but never crosswise or transversely, but always with one of their ends or sides first.

Another object is to provide a milling machine in which the speed of the grain feed to the milling rollers can be controlled so that the grain to be milled may be fed to the milling rollers at an increased speed which will result in the grain being more uniformly ground and milled, particularly during the first coarse grinding stage in which the grains during their passage through the feeding or rubber rollers are rotated into such a position that the grains no longer drop upon the grinding rollers in a transverse position, but with one of their ends or sides first, and will increase the milling capacity of the mill without heretofore experienced deleterious effects such as an undesirable amount of small hull particles finding their way into the flour, which would result in an unnecessary high content of ashes and a darker flour product, but would instead furthermore result in an increase of coarse, medium and fine semolinas especially during the coarse grinding stage.

Hitherto, in flour mills the grain has been fed to the grinding rollers by gravity and it has been known to provide a distributor above the grinding rollers to distribute the grain throughout the entire length of said rollers. Still other devices employ a single roller, a vibrator, or a worm which is intended to distribute the grain to be milled along the bite of the coacting milling rollers. In all cases, however, the grain is fed by gravity. Roller mills of this type have a limited output, and hence a large bank of mills for each grinding and milling step is usually necessary to maintain a predetermined flour output.

All of the known feed devices are disadvantageous in that the grain is fed toward the milling rollers at much too low a speed so that the milling rollers in addition to the milling work are also called upon to accelerate the grain. Therefore, the rollers cause the grain to be unnecessarily and too forcibly crushed and this requires additional power as is evidenced by the fact that heretofore the working surfaces could only be utilized up to approximately 50%, and in view of the higher friction to be overcome there was heretofore produced a darker flour product with high content of ashes since an unnecessary large quantity of small hull particles commingled with the flour.

The above disadvantages and objections are overcome by providing a new and novel feed device which accelerates the speed of the grain to be ground to a speed approximately equal to the circumferential speed of the slower rotating milling roller of each milling roller pair, thereby resulting in increased mill capacity, particularly at the first coarse grinding stage in which the grains enter the grinding rollers in adjusted position without additional power requirement. Furthermore the quality of the flour is substantially improved.

Other objects and advantages of the invention will become apparent during the course of the following description with reference to the accompanying drawings wherein:

Figure 1 is a vertical cross-sectional view of a milling machine constructed in accordance with the present invention, and showing a double mill having two sets of milling rollers, and Figure 2 is a fragmentary cross-sectional view taken on line 2—2 of Figure 1 and looking in the direction of the arrows illustrating the drive mechanism for the various rollers and the manner in which they are supported in the mill housing.

In the drawings, and more in detail, there is shown a milling machine including a housing generally designated 5 which comprises a bottom wall 6, side walls 7 and end walls 8. The upper portions of the side walls 7 are inclined and converge toward a top wall 10 which is provided with an opening 11 for receiving a grain distributor 12 from a feed duct or the like 13. Mounted below the opening 11 and secured to the top wall 10 is a pair of divergent hopper walls 14 which extend between the end walls 8 and extend obliquely toward the center of the milling housing 5. A vertical partition 15 extends centrally of the housing from the bottom wall 6 to the top wall 10, and a pair of angularly disposed walls 16 extend downwardly from the upper portion of the central partition 15 to form a pair of hopper-like chambers 18 and 19.

Mounted in the end walls 8 of the casing is a pair of rotary shafts 20 which extend through the walls 8 and are journalled in suitable bearings 21. The shafts 20 are provided with feed rollers 22 arranged between the ends of walls 14 and 16. Each chamber 18 and 19 is provided with one feed roller 22 adapted to be rotated to feed grain over their peripheral surfaces toward a pair of cooperating grinding rollers therebelow. Feed regulator plates 24 are pivotally connected to the lower portions of the angular walls 14 and extend downwardly in spaced relation from the rollers 22 in such a manner that the sliding plates 24 can be moved toward and away from the rollers by adjusting links 25 which are manually operated to control the flow of grain by the rollers 22 in a direction to feed the grain to the mill rollers therebelow.

Mounted on opposite sides of the vertical partition wall 15 and journalled in suitable bearings 27 in the end walls 8 of the housing 5 is a pair of shafts 29 to which is keyed fast and slow rotating milling rollers 30 which may be provided with co-acting grooved surfaces as usual, or may have their peripheral surfaces otherwise shaped for milling grain in the production of flour. One of the shafts 29 for the slow rotating roller 30 is provided on one end with a pulley 31 which is adapted to be driven from a power shaft or the like by means of a belt drive, while the other end is provided with a gear wheel 31a of increased diameter adapted to mesh with a small gear wheel 31b on the shaft 29 of the other or fast roller 30. Generally, a series of mills are arranged in alignment and a power shaft having a plurality of pulleys is employed with pulleys passing over power by means of belts to the corresponding pulleys of the respective mills.

The shafts 29 are also provided with pulleys 32 for driving pulleys 33 on the shafts 20 through suitable pulley belts or the like 34.

The structure above set forth describes a double flour mill in which the grain to be ground is deposited in the hoppers 18 and 19 and fed to the grinding rollers 30 of which one is driven in customary manner at a lower speed than the other to provide fast and slow rotating milling rollers. After the grain is milled it drops into suitable containers in the lower portion of the milling housing 5. The bottom of the mill is provided with openings for the outlet of the ground product.

The invention comprises means interposed between the feed rollers 22 and the milling rollers 30 to accelerate the rate of speed that the grain is fed to the rollers 30 so as to increase the mill capacity and improve the resultant flour product. In order to accomplish the above, a pair of rubber rollers 40 which also may be made of a plastic or similar material is mounted above each pair of milling rollers 30. In the present invention the rollers 40 are identical in construction for each pair of milling rollers 30 and hence a description of one pair of rollers will suffice for both.

Formed in the end walls 8 are suitable openings arranged in spaced relation for receiving a shaft 41 which has its ends supported in suitable bearing brackets 42 (Figure 2). The shafts 41 of each pair of rollers 40 are provided with rubber sleeves 43 which form between the same a narrow pass of .10 to .12 of an inch. The rubber or plastic sleeved rollers generally designated 40 have their pass arranged above the bite of the milling rollers 30 and are slightly offset from the feed rollers 22 thereabove.

Since the rubber or plastic sleeved rollers 40 are of smaller diameter than the milling rollers 30, it is necessary to rotate them at a greater speed in order to feed the grain by impetus to the bite of the milling rollers 30 at a rapid rate of speed. The shafts 41 are provided on one of their ends with intermeshing sets of gears 44 and a pulley 45 on the opposite end of one of the shafts 41 is drivingly connected to a pulley 46 on the shaft 29 of the fast milling roller by means of a belt or the like 47. Thus, when the shaft 29 is rotated it is intended to dimension the pulleys 45 and 46 so that the shaft 41 will rotate faster than the shaft 29 and will be driven by the shaft 29 through the belt 47. Hence, when the rubber or plastic sleeved rollers 40 are driven at a greater rate of speed than the slower rotating roller 30 the grain to be milled will be projected downwardly at a rapid rate of speed to the bite of the milling rollers 30. Obviously, as the speed of the rollers 30 is increased to provide an increased circumferential milling speed which is possible with the present invention without any harmful results on the quality of the peripheral speed of the ground product, the rubber rollers will likewise be increased in speed and by changing the dimensions of the pulleys 45 and 46, various speed changes may be obtained to produce rapid grain feed and rapid rotation of the milling rollers 30. Downwardly converging guide plates 50 are arranged between the end walls 8 of the milling housing and are positioned above the bite of the rubber or plastic sleeved rollers 40 and are adapted to receive grain passing over the feed rollers 22 and beneath the feed plates 24. Similar guide plates may be arranged between the feed rollers 40 and the milling rollers 30 if desired or if necessary.

The rubber or plastic sleeves on the rollers 40 are approximately one-half inch thick and the diameter of the rollers 40 is approximately three inches. As compared to the diameter of the conventional milling rollers, it will readily be understood that the rollers will rotate with an increased speed greater than the milling roller speed and that the grain fed therebetween will be projected downwardly at a rapid rate of speed, thus resulting in a greatly increased mill capacity and product improvement by using the regular milling roller speeds of 500 and 200 r.p.m., respectively. Obviously, if the speeds of the acceleration rollers and milling rollers will be increased respectively, the mill capacity will be increased further with the same quality improvements of the flour product.

When the grain reaches the pass between the smooth rubber rollers the grain will be immediately rotated to a position lengthwise or broadwise in the narrow entrance zone of the pass so as to drop with their ends or sides first into the grinding zone formed between the milling rollers. This grinding zone will be only about half as long as in the conventional milling machines in view of the controlled position of the grains and will be very effective in milling the grains.

The feed rollers 22 are usually made in variable sizes of 3 to 4 inches in diameter and are driven with a speed of 120 to 200 r.p.m. Usually the diameter of the milling rollers is 9" and the faster rotating milling roller of each pair has a speed of approximately 500 r.p.m. which results in a circumferential speed of approximately 20 feet per second. The slower rotating milling roller of each pair has a speed of about 200 r.p.m. which results in a circumferential speed of approximately 8 feet per second.

The rubber roller feeding device of the present invention is not only suitable for newly constructed milling machines, but can also be readily installed in already existing milling machines to improve the quality of the flour and to increase the output capacity of the same.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

What we claim is:

1. In a milling machine, a casing having a hopper therein, a pair of co-acting milling rollers rotatably mounted in said casing beneath said hopper to receive material therefrom, means for rotating each of said milling rollers at a different peripheral speed, and a pair of accelerating rollers having yielding surfaces mounted between the hopper and milling rollers and adapted to feed material by projecting the same downwardly to said milling rollers at a linear speed substantially equal to the peripheral speed of the slower rotating milling roller and at a speed greater than the speed of free gravity fall, the contact line between said feed rollers being positioned with the bite between said milling rollers in a common vertical plane.

2. In a milling machine, a casing having a hopper therein, a pair of co-acting milling rollers rotatably mounted in said casing and adapted to receive material fed by said hopper, means for rotating each of said milling rollers at a different peripheral speed and a pair of accelerating rollers mounted in said casing in the path of the material fed from the hopper to accelerate and project the material feed in the direction of said milling rollers, said second mentioned pair of rollers being provided with a sleeve of yielding material to project the material toward the milling rollers at a linear speed equal to the speed of the slower rotating milling roller and at a speed greater than free fall by gravity, said rollers being arranged to feed the material downwardly with their relatively wide surfaces in a vertical plane, the contact line between said feed rollers being positioned with the bite between said milling rollers in a common vertical plane.

3. In a machine for milling grain and the like, a casing having a hopper in the upper portion thereof, a pair of milling rollers rotatably mounted in bearings in said casing, means for rotating each of said milling rollers at a predetermined different peripheral speed, means for feeding material from said hopper toward said milling rollers, and a pair of rubber covered rollers rotatably mounted in said casing and arranged above said milling rollers, said rubber covered rollers being of a smaller diameter than the milling rollers and driven at an increased speed so that the peripheral speed thereof will cause grain particles to be fed from the hopper to be received between said rubber covered rollers and projected at an accelerated linear speed equal to the peripheral speed of the slower rotating milling roller with their relatively wide surfaces extending flatwise in a vertical plane, the contact line between said feed rollers being positioned with the bite between said milling rollers in a common vertical plane.

4. In a machine for milling grain and the like, a casing having a hopper in the upper portion thereof, a pair of milling rollers journaled in said casing beneath said hopper, means for rotating said milling rollers each at a predetermined different peripheral speed, a pair of rubber covered rollers journaled in said casing and arranged between said hopper and milling rollers, means for rotating said rubber covered rollers at a circumferential speed substantially equal to the peripheral speed of the slower-rotating milling roller whereby the grain being fed to the milling rollers will be projected at an increased linear speed from said rubber covered rollers to said milling rollers with their relatively flat surfaces in a vertical plane, the contact line between said feed rollers being positioned with the bite between said milling rollers in a common vertical plane.

5. In a machine for milling grain, a casing, a hopper in the upper end thereof adapted to receive grain, a pair of milling rollers journaled in said casing, means for rotating said milling rollers each at a predetermined different peripheral speed, means associated with the hopper for controlling the rate of grain feed therefrom, and a pair of rubber covered rollers journaled in said casing to receive material such as grain and the like from said hopper and project the same to the milling rollers at an accelerated speed the bite between said rubber covered rollers being arranged vertically above the bite between said pair of rollers, said rubber rollers having a smooth surface and being driven at a peripheral speed substantially equal to the peripheral speed of the slower rotating milling roller and being of a diameter smaller than said milling rollers to project said grain particles downwardly at a linear speed at least equal to the peripheral speed of said slower rotating milling roller, thereby forming for the grains reaching the pass between said rubber rollers, particularly at the first grinding stage of the process a narrow entrance zone, which in cooperation with the smooth surfaces of said rubber rollers causes a rotative adjustment of the position of the grains, so that the same enter the gap between said milling rollers lengthwise or broadwise with one of their ends or sides first and forming between said milling rollers a relatively short milling zone.

References Cited in the file of this patent

UNITED STATES PATENTS

| | | |
|---|---|---|
| Re. 10,579 | Wegmann | Apr. 7, 1885 |
| 801,259 | Neumann | Oct. 10, 1905 |
| 1,450,723 | Gillespie | Apr. 3, 1923 |
| 1,534,188 | Rebechini | Apr. 21, 1925 |
| 2,231,185 | Gisriel | Feb. 11, 1941 |

FOREIGN PATENTS

| | | |
|---|---|---|
| 9,266 | Great Britain | of 1898 |